(12) United States Patent
Koulinitch

(10) Patent No.: US 7,231,288 B2
(45) Date of Patent: Jun. 12, 2007

(54) SYSTEM TO DETERMINE DISTANCE TO A LEAD VEHICLE

(75) Inventor: Anatoli S. Koulinitch, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 165 days.

(21) Appl. No.: 11/080,234

(22) Filed: Mar. 15, 2005

(65) Prior Publication Data
US 2006/0212215 A1 Sep. 21, 2006

(51) Int. Cl.
*G01C 21/00* (2006.01)

(52) U.S. Cl. .......................................... 701/96; 348/118

(58) Field of Classification Search ...................... None
See application file for complete search history.

(56) References Cited

U.S. PATENT DOCUMENTS

| | | | |
|---|---|---|---|
| 4,289,388 A | 9/1981 | Wakabayashi et al. | |
| 5,307,136 A | 4/1994 | Saneyoshi | |
| 5,410,346 A * | 4/1995 | Saneyoshi et al. | 348/116 |
| 5,487,116 A * | 1/1996 | Nakano et al. | 382/104 |
| 5,640,625 A | 6/1997 | Hozumi | |
| 6,151,539 A | 11/2000 | Bergholz et al. | |
| 6,169,572 B1 | 1/2001 | Sogawa | |
| 6,208,268 B1 | 3/2001 | Scarzello et al. | |
| 6,212,468 B1 | 4/2001 | Nakayama | |
| 6,246,961 B1 | 6/2001 | Sasaki et al. | |
| 6,392,539 B1 | 5/2002 | Kanasugi | |
| 6,473,517 B1 | 10/2002 | Tyan et al. | |
| 6,477,260 B1 | 11/2002 | Shimomura | |
| 6,531,959 B1 | 3/2003 | Nagaoka et al. | |
| 6,556,913 B2 * | 4/2003 | Morizane et al. | 701/93 |
| 6,570,998 B1 * | 5/2003 | Ohtsuka et al. | 382/104 |
| 2002/0027503 A1 | 3/2002 | Higuchi | |
| 2002/0057195 A1 * | 5/2002 | Yamamura | 340/435 |
| 2002/0131621 A1 | 9/2002 | Ohta | |
| 2003/0152290 A1 | 8/2003 | Odell | |
| 2003/0156737 A1 | 8/2003 | Ohtsuka et al. | |
| 2003/0190058 A1 | 10/2003 | Jun et al. | |

(Continued)

FOREIGN PATENT DOCUMENTS

DE 19948608 5/2000

(Continued)

OTHER PUBLICATIONS

Massachusetts Institute of Technology Artificial Intelligence Laboratory, A.I. Memo No. 1594, Nov. 1996, Direct Methods for Estimation of Structure and Motion from Three Views, Gideon P. Stein and Amnon Shashua, pp. 1-8.

(Continued)

*Primary Examiner*—Michael J. Zanelli
(74) *Attorney, Agent, or Firm*—Brinks Hofer Gilson & Lione

(57) ABSTRACT

A system implemented in a vehicle to detect a lead vehicle includes a camera which captures an image of the rear of the lead vehicle and an image processing system that receives image data from the camera. The image processing system is implemented with an algorithm that includes a preprocessing layer, an image segmentation layer, and a detection layer to analyze the image data to determine the relative distance between the vehicle and the lead vehicle.

12 Claims, 2 Drawing Sheets

U.S. PATENT DOCUMENTS

| | | | |
|---|---|---|---|
| 2003/0235327 A1* | 12/2003 | Srinivasa | 382/104 |
| 2004/0016870 A1 | 1/2004 | Pawlicki et al. | |
| 2004/0054473 A1 | 3/2004 | Shimomura | |
| 2004/0057601 A1 | 3/2004 | Honda | |
| 2004/0119633 A1 | 6/2004 | Oswald et al. | |

FOREIGN PATENT DOCUMENTS

| | | |
|---|---|---|
| JP | 7334799 | 12/1995 |
| JP | 2000-090268 | 3/2000 |
| JP | 2001-175845 | 6/2001 |
| JP | 2002-096702 | 4/2002 |
| JP | 2002-329298 | 11/2002 |
| JP | 2004-355139 * | 12/2004 |

OTHER PUBLICATIONS

IEEE Intelligent Vehicles Symposium (IV2003), Jun. 2003, Columbus, Ohio Vision-based ACC With a Single Camera: Bounds on Range and Range Rate Accuracy, Gideon P. Stein, Ofer Mano and Amnon Shashua.

* cited by examiner

SYSTEM TO DETERMINE DISTANCE TO A LEAD VEHICLE

BACKGROUND

The present invention generally relates to an image-processing system implemented in a vehicle to determine the distance between the vehicle and a lead vehicle.

Recently, some vehicles have been implemented with driver assistance systems, such as detection systems that detect objects in front of the vehicle. Certain detection systems analyze the movement of surrounding vehicles to provide an estimate to a driver utilizing the detection system of the available room for maneuvering the vehicle in which the driver resides.

Since it is desirable to implement these detection systems in real time, there is a need for a system with improved computational efficiency for detection and tracking of objects in front of the vehicle.

SUMMARY

In a general aspect of the invention, a system implemented in a vehicle to detect a lead vehicle includes a camera which captures an image of the rear of the lead vehicle and an image processing system that receives image data from the camera. The image processing system is implemented with an algorithm that includes a preprocessing layer, an image segmentation layer, and a detection layer to analyze the image data to determine the relative distance between the vehicle and the lead vehicle.

Further features and advantages will become readily apparent from the following description, and from the claims.

DETAILED DESCRIPTION

Figure 1:
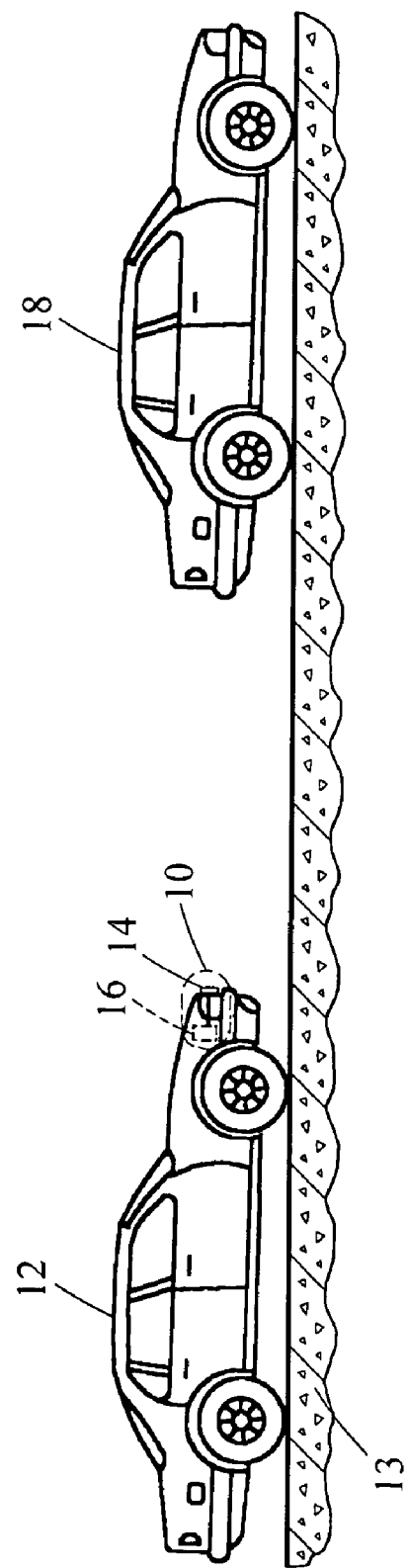
FIG. 1 illustrates a vehicle with an image-processing system to detect other vehicles in accordance with the invention.

Referring now to FIG. 1, a system embodying the principles of the present invention is illustrated therein and designated at 10. The system 10 resides in a vehicle 12 and, as its primary components, includes a camera 14 and an image processing system 16. As the vehicle 12 maneuvers along a road 13, the camera 14 captures images of a vehicle 18 in front of the vehicle 12. From these images, the image processing system 16 estimates the distance between the vehicle 12 and the lead vehicle 18. The image processing system 16 processes the image data with a high signal to noise ratio permitting effective implementation of fast and robust detection and tracking of the vehicle 18.

Figure 2:
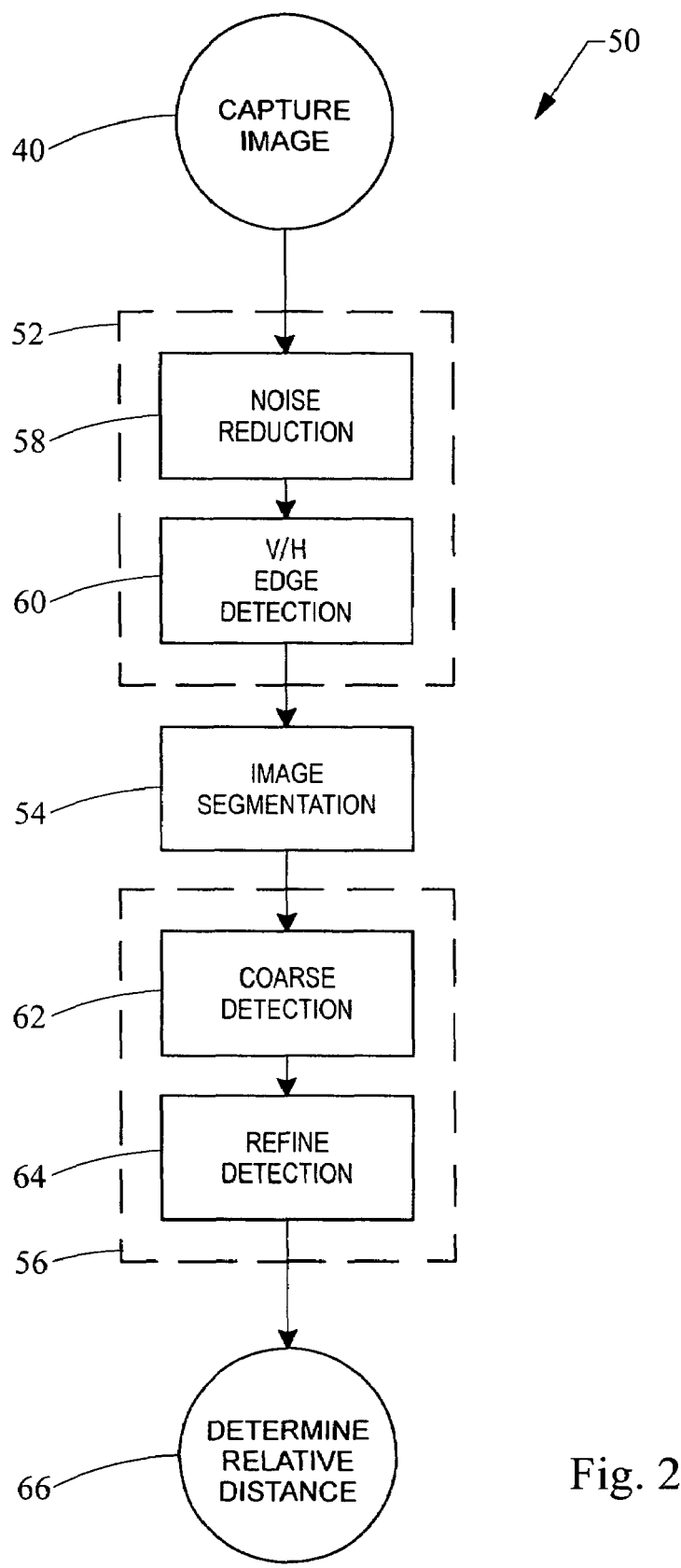
FIG. 2 is flow diagram of an algorithm implemented in the image-processing system.

As shown in FIG. 2, images 40 captured by the camera 14 are processed in an algorithm 50 implemented in the image processing system 16. The algorithm 50 includes a preprocessing layer 52, an image segmentation layer 54, and a two-level detection layer 56 to determine a relative distance 66 between the lead vehicle 18 and the vehicle 12.

The preprocessing layer 52 includes a noise reduction step 58 and a horizontal/vertical (V/H) edge detection step 60. The noise reduction step 58 employs Gausses filter with a {3*3} kernel for smoothing and a sharpening filter to provide sharper edges. The preprocessing layer 52 also uses statistics of the image within the field of search to set a dynamic threshold (i.e. an adaptive threshold), and suppresses noise and enhances object features, which are relevant for analyzing the image. The preprocessing layer 52 may use different criteria to calculate the length for short-interrupted edges.

The horizontal/vertical edge detection step 60 employs Sobel filters to determine independent maps of the horizontal edges and the vertical edges. The grey level horizontal and vertical edge maps are defined by a finite difference approximation of the brightness gradient. The edge search is based on binary image presentation, and image low-level analysis uses a set of criteria and metrics to define a no-fail edge detection or non-sharp horizontal/vertical features.

The image segmentation layer 54 separates objects from the image background, and provides the horizontal and vertical edge link to form a vehicle image.

The two-level detection layer 56 includes a coarse step (or level) 62 and a refining step (or level) 64. The coarse step 62 is a hypothesis generation step using information of vertical and horizontal edges to hypothesize the location of the lead vehicle 18 in the image. The refining step 64 is a hypothesis verification step. That is, the true existence of a vehicle 18 is tested by data consistency analysis using different dependencies between vehicle image allocation and vehicle dimensions to verify the distance of the lead vehicle 18 from the vehicle 12. The consistency analysis follows a detection criterion, which states that important edges should not be missed, and that there should be no spurious responses, and a localization criterion, which states that the distance between the actual and located position of the edge should be minimal.

Other features of the image processing system 16 include the following:

Detection of Edges with Noise

A range (or distance) edge map is formed for each of the analyzed frames of the image (for detection or tracking) based on fusing of the following filtering techniques. Edge detection is based on a discrete anti-noise convolution algorithm and is optimal for edges corrupted by white noise. An algorithm search threshold edge maps for prominent (i.e., long, low level short-interrupted) edges. When such horizontal edges are found in the image (i.e., in the field of search) during the coarse search, the refined search process begins in that region (i.e., the candidate region). The resulting filter can be approximated effectively by the first derivative of a Gaussian smoothing filter. Since the images typically have a high level of noise in the top half of the images, not all of the vehicle shape is searched. That is, the searching and analysis is constrained to the bottom of the rear view of the vehicle 18.

Calibration

Range image calibration tables are based on radar-based explicit range measurement per feature of the vehicle 18. The calibration tables are employed to analyze the segment-consistency for range estimation of the lead vehicle 18. Information about camera-viewpoint position and calibration data acquired from testing vision data are used to define the search space (i.e., the filed of search) and to transform a 2-D model to a 3-D hypothesis model.

Since a width of the vehicle 18 correlates with the distance to the vehicle 18 for vehicles of a specific group, three classes of vehicles are employed: (1) passenger (sedan) car; (2) vans; (3) trucks. The algorithm 50 uses these three classes as base models for consistency checking of images with partially visible vehicles or images with noisy vehicle shapes, such as, for example, the shadow of a lead vehicle or vehicle on adjacent lanes or other static or dynamics objects such as bridges, building, and the like.

Each calibration table contains three columns and describes the following dependencies: Row Position→Vehicle Width→Distance. A consistency analysis evaluates how these features relate to each other for the current image.

At short distances, the bottom of the vehicle 18, for example, the points of contact between the vehicle 18 and the road 13, may not be visible. In such situations, the following dependencies are employed: Vehicle Width→Distance from the calibration table to estimate the range between the vehicle 12 and the lead vehicle 18.

Knowledge and Consistency Rule

To determine vehicle class, the system 16 a priory knowledge about the shapes and the motion parameters as calibration data to detect a leading vehicle. A parameterized vehicle model also takes into account shadow edges under complex lighting conditions, resulting in a small effective field of view.

Detection

Detection is achieved by establishing a match between a set of 2-D image segment features (i.e. two vertical edges on the left and right to define a width) and a horizontal edge to calculate a distance to the leading vehicle. The resulting range image is formed based on the synthesized vertical and horizontal edge maps of the view of the rear of the lead vehicle 18, which provides input data for a segmentation algorithm. The system 16 uses a feature-based technique to detect distant cars, looking for rectangular objects by evaluating horizontal and vertical edges.

Coarse Step-horizontal Edge Search

The refined search step 64 is employed only for small regions of the edge maps, while the coarse search step 62 is executed on the entire field of search. The coarse search step uses objective functions to define a significant horizontal edge defined as a bottom line of an image. Step 64 is also able to account for false edge detection.

In some instances, the first detected horizontal edge is part of the image line inside the vehicle because of the low contrast between the vehicle bottom side and the road (background). With an estimated cost function, the vehicle height may be defined by the length of the vertical edge.

Refined Step-vertical Edges

A voting process is performed to derive a reduced edge-image space within the field of search. Vertical edges are searched starting from the side with the bigger cost function for a defined horizontal edge. Consistency checks detect possible failure of vehicle recognition. To verify that a potential object is a vehicle, an objective function is evaluated as follows:

A first vertical edge is searched starting from the side with bigger cost function including the aspect ratio of the two candidates for each side (left, right) and for two directions (up and down).

A potential vehicle is marked by the two bottom corners. If the correlation yields a high value, the system 16 determines that a vehicle is detected and calculates a 2-D location in the image, and its size.

When a vehicle candidate has been detected, 2-D generic models describing the visual characteristics of the leading vehicle is employed to classify real vehicle parameters and estimate 3-D dynamical characteristics.

Consistency Based Range Estimation Method

Calibration lookup tables provide an explicit range for distance estimation. The estimated distance results from two methods weighted by cost functions. The first method uses the bottom of the vehicle image which is effective for ranges in the interval between about 10 and 50 meters. The second method uses a width, especially when the bottom edge is not visible. The selection of one of the three calibration tables is determined by the estimate of the vehicle height (i.e., the height of the vertical edges).

Partial Visible Vehicle Shape

If an image does not contain the entire rear view the vehicle 18, the vertical edge map is incomplete. However, a significant bottom horizontal edge and a single vertical edge can be used to provide a distance estimation with reduced-level confidence (probability level). This may occur, for example, for partially occluded vehicles that occur during a lane change.

Tracking

The system 16 further includes a tracking feature that maintains correspondence between range vehicle images identified at successive detection steps. The tacking feature may include only a refining search with corrections to the prediction of the lead vehicle. A Kalman filter may be employed to account for the non-linear dependencies between tracked features, for example, movement of two corners that have a strong correlation with their row positions.

The tracking feature helps identify the disappearance of the lead vehicle, for example, during a lane change or during other maneuvers. For this reason, the detection algorithm uses a time interval in the range between about 30 and 50 sec to detect any new vehicle which can occupy the space between the vehicle 12 and the original lead vehicle. To recognize lane change maneuvers, a lane boundary recognition algorithm estimates the relative position of the lead vehicle. To accelerate the detection algorithm without conflicting with the frame processing and analysis, complex dynamic scene analysis is based on bi-directional data cooperation between the recognition and tracking features.

Lane Boundary Detection and Recognition

The system 16 uses a lane boundary detection decomposition approach based on scene recognition (vehicle/lane boundary) as a hierarchical process. Further, the system 16 analyses the lane boundary geometry to calculate the elevation or descent of the road (i.e., the non-planarity) in the filed of search.

In some implementations, the image processing system 16 employs Visual C++ to process the captured images of the vehicles. In sum, the system 16 provides Synthesis mechanism for forming a single edge map by synthesizing the vertical/horizontal V/H edges maps corresponding to different Sobel filters.

Field of search mechanism for forming polygon data describing the space on the lane occupied by the host vehicle with respect to possible curved roads and fixed maximum ranges.

Range image processing mechanism to convert to field of search entered gray scale image into synthesized vertical/horizontal edge maps Searching technique in the filed of search for features of interest such as a vertical and horizontal edge map with partial vertical symmetry Approximating a shape of a rear-view of a vehicle with a rectangle to measure a range and distance to the lead vehicle Correction technique, which includes analysis of lane boundary geometry to calculate elevation or descent of the road in the field of search.

Other embodiments are within the scope of the following claims.

What is claimed is:

1. A system implemented in a vehicle to detect a lead vehicle comprising:
    a camera which captures an image of the rear of the lead vehicle;
    an image processing system that receives image data from the camera, the image processing system being implemented with an algorithm that includes a preprocessing layer, an image segmentation layer, and a detection layer to analyze the image data to determine the relative distance between the vehicle and the lead vehicle;
    wherein the preprocessing layer reduces noise in the image data and generates vertical and horizontal edge maps; and
    wherein the preprocessing layer includes a Gausses filter and a sharpening filter.

2. The system of claim 1 wherein the preprocessing layer includes a Sobel filter.

3. A system implemented in a vehicle to detect a lead vehicle comprising:
    a camera which captures an image of the rear of the lead vehicle;
    an image processing system that receives image data from the camera, the image processing system being implemented with an algorithm that includes a preprocessing layer, an image segmentation layer, and a detection layer to analyze the image data to determine the relative distance between the vehicle and the lead vehicle; and
    wherein the detection layer includes a coarse level and a refine level.

4. The system of claim 3 wherein the coarse level is a hypothesis generation level that uses information of vertical and horizontal edges to hypothesize the location of the lead vehicle.

5. The system of claim 4 wherein the refining level is a hypothesis verification level that determines the true existence of the lead vehicle to verify the distance to the lead vehicle.

6. The system of claim 5 wherein the true existence of the lead vehicle is tested by data consistency analysis using different dependencies between vehicle image allocation and vehicle dimensions.

7. A method to detect a lead vehicle in front of a vehicle comprising the steps of;
    capturing an image of the rear of the lead vehicle with a camera;
    processing image data from the camera with an algorithm that includes a preprocessing layer, an image segmentation lever, and a detection layer to determine the relative distance between the vehicle and the lead vehicle;
    wherein the preprocessing layer reduces noise in the image data and generates vertical and horizontal edge maps; and
    wherein the preprocessing layer includes a Gausses filter and a sharpening filter.

8. The method of claim 7 wherein the preprocessing layer includes a Sobel filter.

9. A method to detect a lead vehicle in front of a vehicle comprising:
    capturing an image of the rear of the lead vehicle with a camera;
    processing image data from the camera with an algorithm that includes a preprocessing layer, an image segmentation layer, and a detection lever to determine the relative distance between the vehicle and the lead vehicle; and
    wherein the detection layer includes a coarse lever and a refine level.

10. The method of claim 9 wherein the coarse level is a hypothesis generation level that uses information of vertical and horizontal edges to hypothesize the location of the lead vehicle.

11. The method of claim 9 wherein the refining level is a hypothesis verification level that determines the true existence of the lead vehicle to verify the distance to the lead vehicle.

12. The method of claim 11 wherein the true existence of the lead vehicle is tested by data consistency analysis using different dependencies between vehicle image allocation and vehicle dimensions.

* * * * *

UNITED STATES PATENT AND TRADEMARK OFFICE
CERTIFICATE OF CORRECTION

| | | |
|---|---|---|
| PATENT NO. | : 7,231,288 B2 | Page 1 of 1 |
| APPLICATION NO. | : 11/080234 | |
| DATED | : June 12, 2007 | |
| INVENTOR(S) | : Anatoli S. Koulinitch | |

It is certified that error appears in the above-identified patent and that said Letters Patent is hereby corrected as shown below:

Column 6, in claim 7, line 7, before "and a detection layer" delete "lever," and substitute --layer,-- in its place.

Column 6, in claim 9, line 10, after "includes a coarse" delete "lever" and substitute --layer-- in its place.

Signed and Sealed this

Twenty-first Day of August, 2007

JON W. DUDAS
*Director of the United States Patent and Trademark Office*